United States Patent [19]

Heytmeijer et al.

[11] 4,178,355

[45] Dec. 11, 1979

[54] METHOD FOR PREPARING DICALCIUM ORTHOPHOSPHATE FOR USE IN FLUORESCENT LAMP PHOSPHORS

[75] Inventors: Herman R. Heytmeijer, Hanover Township, Morris County, N.J.; Larry P. Rusch, Salina, Kans.; Giuseppe Grasso, Parsippany Troy Hills, N.J.

[73] Assignee: Westinghouse Electric Corp., Pittsburgh, Pa.

[21] Appl. No.: 878,852

[22] Filed: Feb. 17, 1978

[51] Int. Cl.$^2$ ............................................. C01B 25/32
[52] U.S. Cl. .................................................... 423/308
[58] Field of Search .......................................... 423/308

[56] References Cited

U.S. PATENT DOCUMENTS

| | | | |
|---|---|---|---|
| 3,095,269 | 6/1963 | Chiola et al. | 423/308 |
| 3,395,979 | 8/1968 | Schafer | 423/308 |
| 3,420,625 | 1/1969 | Margolis | 423/308 |
| 3,864,274 | 2/1975 | Heytmeijer | 423/308 |
| 3,927,180 | 12/1975 | Chenot | 423/308 |
| 3,940,343 | 2/1976 | Demarest et al. | 423/308 |
| 4,044,105 | 8/1977 | Enomoto et al. | 423/308 |

*Primary Examiner*—O. R. Vertiz
*Assistant Examiner*—Wayne A. Langel
*Attorney, Agent, or Firm*—R. S. Lombard

[57] ABSTRACT

A method of preparing anhydrous dicalcium orthophosphate of predetermined and substantially uniform particle size for use in making fluorescent lamp phosphors. The method entails heating an acidified aqueous slurry of hydrated dicalcium orthophosphate in a reaction vessel and at the same time agitating the heated slurry. The heating and simultaneous agitation is continued until significant incipient formation of a gel-like material is manifested at the wall portions of the reaction vessel. At that point the application of heat to the slurry is discontinued. The agitation of the slurry within the vessel is continued until all the slurry is converted to meta-stable gel-like material. At that time the agitation is discontinued. The formed meta-stable gel-like material is then maintained in a quiescent state until it converts completely to crystals of dicalcium orthophosphate. The orthophosphate crystals are then permitted to settle to the bottom of the residual liquid in the vessel. The settled crystals are then separated from the residual liquid.

8 Claims, 1 Drawing Figure

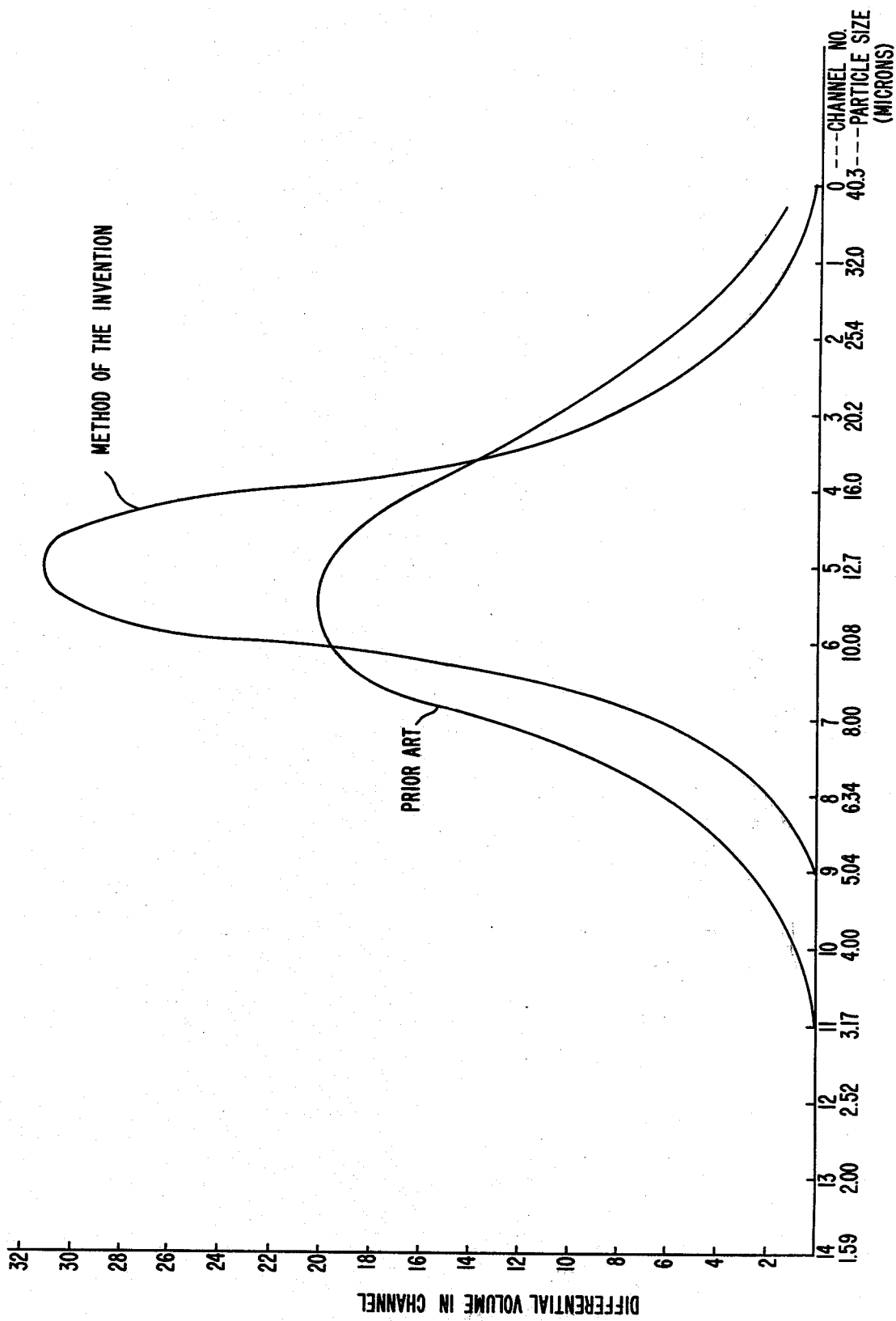

_METHOD FOR PREPARING DICALCIUM ORTHOPHOSPHATE FOR USE IN FLUORESCENT LAMP PHOSPHORS_

BACKGROUND OF THE INVENTION

The invention relates to a method for preparing anhydrous dicalcium orthophosphate of predetermined and substantially uniform particle size for making calcium halophosphate phosphors for use in fluorescent lamps.

Phosphors comprising calcium halophosphates are used to convert ultraviolet radiations to visible light in fluorescent lamps. These phosphors may be represented by the general formula:

$Ca_5(PO_4)_3(Cl, F): Mn, Sb$

The major raw material used to prepare this class of phosphors is anhydrous dicalcium orthophosphate ($CaHPO_4$), and it is this component which has the greatest influence on the finished phosphor particles, including characteristics such as size and shape. As is known in the art, a narrow particle size distribution of the phosphor is desirable to achieve maximum light output. In the usual commercial process, $CaHPO_4$ is prepared by an essentially two-step process. The first step involves precipitating the dihydrate form of the calcium phosphate by mixing and reacting calcium chloride (or nitrate) solution with diammonium phosphate solution. The dihydrate is then recrystallized to anhydrous dicalcium orthophosphate of the desired purity, particle size and particle shape. The prior art methods for the recyrstallization or conversion of $CaHPO_4.2H_2O$ to $CaHPO_4$ have very often yielded $CaHPO_4$ materials containing many fine particles, coarse particles, agglomerates or combinations thereof.

A typical prior art method for making $CaHPO_4$ involves heating an acidified (generally with $H_3PO_4$) aqueous slurry of $CaHPO_4.2H_2O$ under vigorous agitation to the desired temperature range where the "recrystallization" occurs. In this temperature range (generally 70°–95° C.) the slurry gradually thickens and gels to a certain degree. The extent of the gelation is dependent on the nature of the $CaHPO_4.2H_2O$ used, the slurry concentration (solids content), the degree of acidification, the degree of agitation, the temperature, and the heating rate. After about 5–30 minutes of heating and agitation at the recrystallization temperatures, the gel begins to break down and when the slurry again appears homogeneous with no evidence of gel globules, the conversion to $CaHPO_4$ is complete. The product formed generally consists of rather square, transparent, platelike crystals somewhat nonuniform in size, with many fines.

In U.S. Pat. No. 3,395,979 issued to Schafer, dated Aug. 6, 1968 is disclosed a continuous or semicontinuous process for the conversion of $CaHPO_4.2H_2O$ wherein the $CaHPO_4.2H_2O$ is raised to the desired temperature range and is allowed to form a gel column supported on a screen in a reaction vessel. As the conversion occurs, crystals of $CaHPO_4$ fall through the screen and are separated from the gel. The process as disclosed involves continuously feeding dihydrate slurry and permitting converted $CaHPO_4$ and residual liquid to be drained off. Continuous-type processes are subject to back mixing of converted and partially converted crystals resulting in agglomerations and particle size nonuniformity.

SUMMARY OF THE INVENTION

There is provided an improved method of preparing dicalcium orthophosphate of predetermined and substantially uniform particle size for use in making phosphors for fluorescent lamps. The method is a batch process that prevents back mixing of $CaHPO_4$ crystals and comprises heating an acidified aqueous slurry of hydrated dicalcium orthophosphate ($CaHPO_4.2H_2O$) in a reaction vessel and simultaneously agitating the heated slurry within the vessel. The heating and simultaneous agitation is continued within the vessel until formation of a gel-like material is manifested at the wall portions of the reaction vessel. The application of heat is then discontinued while the agitation of the slurry is continued within the vessel until all of the slurry is converted to a meta-stable gel-like material, at which time further agitation of the then-formed gel-like material is discontinued. The formed meta-stable gel-like material is then maintained in a quiescent state until it converts completely to crystals of dicalcium orthophosphate. The orthophosphate crystals are permitted to settle to the bottom of residual liquid in the vessel. The settled orthophosphate crystals are then separated from the residual liquid.

BRIEF DESCRIPTION OF THE DRAWING

In the drawing, the sole FIGURE is a graph representing particle size distributions of $CaHPO_4$ produced by the aforementioned typical prior art method and by the method of the present invention.

DESCRIPTION OF THE PREFERRED EMBODIMENT

The present method for preparing anhydrous dicalcium orthophosphate produces particles of predetermined and substantially uniform size for making calcium halophosphate phosphors for use in fluorescent lamps. In practicing this method, an acidified aqueous slurry of hydrated dicalcium orthophosphate ($CaHPO_4.2H_2O$) having a pH of from about 3.5 to 5.5, for example, is heated, such as to about 85°–95° C., in a reaction vessel such as a steam-jacketed, stirrer-equipped tank reactor while simultaneously agitating the heated slurry within the vessel. This simultaneous heating and agitation is continued within the vessel until formation of a meta-stable gel-like material is manifested at the wall portions of the reaction vessel. The application of heat to the slurry at this point is discontinued by immediately stopping the steam injection. The agitation of the slurry within the vessel is continued until all of the slurry is converted to the meta-stable gel-like material, at which time further agitation of the then-formed gel-like material is discontinued. All of the slurry should preferably be converted to the meta-stable gel-like material in less than about 3 minutes after formation of gel-like material is manifested at the wall portions of the reaction vessel. The continuation of the stirring until the gel is completely formed is necessary to maintain temperature uniformity throughout the slurry until the gelation is complete. This is evidenced by a very rapid viscosity increase to the point where the entire material appears as a gel. At that time, agitation is stopped to prevent disturbing the formed gel-like material. The formed meta-stable gel-like material is then maintained in a quiescent state until it converts completely to crystals of dicalcium orthophosphate. The orthophosphate crystals are permitted to settle to the bottom of residual liquid in the vessel. This entire recrystallization from gelation to setting usually takes from 5-20 minutes. The settled orthophosphate crystals are then separated from the residual liquid. This may be accomplished by siphoning off the hot residual liquid. Cold water is then added to cool the slurry, and the solids are separated from the waste liquor, washed, and dried by conventional means.

It is important to judge the time at which the application of heat should be discontinued or, in this embodiment, the steam shutdown point. If, for example, the steam shutdown occurs too early, the slurry will not gel properly and the product will contain many fines. If the steam shutdown occurs too late, there will be much boiling at the walls of the reactor, resulting in a product with a wide particle size distribution. $CaHPO_4$ manufactured by the present batch process consists of nearly square crystals of very uniform particle size and contains very few fines.

It is desirable to use a proper $CaHPO_4.2H_2O$. Not all dihydrates behave the same during conversion. It is therefore desirable to prepare the dihydrate slurry in a manner which will yield a precipitate with desirable characteristics. These characteristics include a high gelation temperature (greater than about 85° C.) and rapid progression of gelation in less than about 3 minutes. This is desirable to insure complete recrystallization in a resonable amount of time, for if the dihydrate gels at a too low temperature, the timed required for conversion becomes quite lengthy. Also, the precipitate desirably should gel rapidly or an inhomogeneity may result yielding poor product. Dihydrate characteristics may be varied quite easily, as is well known in the art. Parameters such as reaction temperature, degree of agitation during precipitation, residence time, solution concentration and pH, among others, all contribute to changing the dihydrate precipitate characteristics.

The preferred embodiment may be best described by giving an example of the procedure employed.

EXAMPLE

Preparation of $CaHPO_4.2H_2O$

The precipitate slurry is made by continuously reacting 2.0 molar $CaCl_2$ solution with 2.0 molar diammonium phosphate solution using a slight chloride excess (about 6% over stoichiometric) to produce the dicalcium orthophosphate in a continuous stirred tank reactor of approximately 230 l working capacity. The effluent from this reactor flows continuously into another continuous stirred tank reactor of approximately 160 l working capacity in order to ensure completion of the precipitation reaction. The slurry then overflows from this second reactor to a rotary drum vacuum filter for separation and washing of the solids. The filtered and washed solids are then reslurried in water and stored in a holding tank prior to conversion to anhydrous dicalcium orthophosphate.

It is desirable to control the reaction conditions in order to obtain a dihydrate that performs properly during recrystallization. For example, the reactant solutions should be between about 25° C. and about 35° C.; they are preferably introduced into the first precipitation tank in multiple streams such as 10-15 streams for each reactant, with agitation in the vessel. Agitation is provided by a twin blade propeller mixer operating at 450 RPM which provides the necessary turbulence and top-to-bottom pumping action. Other operating conditions are: for $CaCl_2$, 12.3 lpm flow rate at pH 4.5 and for $(NH_4)_2HPO_4$, 11.6 lpm flow rate.

Conversion to Anhydrous Dicalcium Orthophosphate

The reaction vessel is a standard steam-jacketed glass-lined tank of about 1300 l capacity equipped with D-baffle, standard retreat curve impeller, steam pressure and temperature controller-recorder, and supplied with high-pressure steam (25-90 psi). Approximately 850 liters of precipitate slurry containing about 143 kilograms of $CaHPO_4.2H_2O$ in water is introduced into the reactor and diluted to a total volume of approximately 1300 l with water. The remainder of the process is as follows:

a. the slurry is acidified with 940 ml of 85% $H_3PO_4$, providing a pH of about 4.5;

b. the heating cycle is begun (45 psi steam) and continued preferably to about 85°-95° C. until the slurry starts to gel significantly at the heated walls, at which point the heating is discontinued; stirring, however, is continued while the gelation process advances towards the center of the tank;

c. at the point in time that the entire slurry is gelled as determined by observation, the agitation is stopped;

d. the gel-like material is allowed to remain in a metastable quiescent state until it breaks down completely of its own accord (usually 5-20 min.), and the crystals of dicalcium orthophosphates settle to the bottom of the reactor. At this point the conversion is complete; and e. the residual liquid is siphoned off, cold water is added to reduce the slurry temperature to about 60° C. and the solids are separated from the waste liquor with a perforated basket centrifuge rotating at about 300 RPM, the solids are then spray-washed with water, spin-dried in the centrifuge rotating at about 1000 RPM then placed on a tray drier and heated to a temperature of about 135° C. until substantially dry, yielding approximately 114 kilograms of $CaHPO_4$ with a very narrow particle size distribution and containing very few fines.

The curves shown on the graph in the sole FIGURE show the improvement in particle size distribution produced by the method of this invention over that of a typical standard method. The data for the curves were determined by means of a "Coulter Counter", model T. As is well known in the art, such a counter determines particle size distribution by means of an actual count of the individual particles as segregated into various particle size distributions, indicated on the abscissa by the Channel Numbers, and also by average particle size. The ordinate in the sole FIGURE indicated the volume of the individual particles in each group of particle segregations or so-called channel. As shown in the sole FIGURE, the method of the present invention produces a much narrower particle size distribution as compared to that obtained by the prior art.

What is claimed is:

1. A method of preparing anhydrous dicalcium orthophosphate of predetermined and substantially uniform particle size for making calcium halophosphate phosphors for use in fluorescent lamps, said method comprising:

(a) heating an acidified aqueous slurry of hydrated dicalcium orthophosphate ($CaHPO_4.2H_2O$) in a reaction vessel and simultaneously agitating said heated slurry within said vessel;

(b) continuing said heating and simultaneous agitation within said vessel until formation of a meta-stable gel-like material is manifested at the wall portions of said reaction vessel;

(c) discontinuing the application of heat to said slurry upon manifestation of said meta-stable gel-like material while continuing the agitation thereof within said vessel until all of said slurry is converted to said meta-stable gel-like material, at which time further agitation of the then-formed gel-like material is discontinued;

(d) maintaining said formed meta-stable gel-like material in a quiescent state until it converts completely to crystals of said anhydrous dicalcium orthophosphate, and permitting said orthophosphate crystals to settle to the bottom of residual liquid in said vessel; and (e) separating said settled orthophosphate crystals from said residual liquid.

2. The method as specified in claim 1, wherein said hydrated dicalcium orthophosphate has a gelation temperature greater than about 85° C. and will convert to a completely gelled material at this temperature in less than about three minutes.

3. The method as specified in claim 2, wherein said hydrated dicalcium orthophosphate is made by continuously reacting calcium chloride solution with diammonium phosphate solution to produce said dicalcium orthophosphate.

4. The method as specified in claim 3, wherein said orthophosphate solution and said chloride solution are maintained at a temperature between about 25° C. and about 35° C.

5. The method as specified in claim 1, wherein said reaction vessel is a steam-jacketed stirrer-equipped tank reactor.

6. The method as specified in claim 1, wherein said slurry of hydrated dicalcium orthophosphate has a gelation temperature greater than about 85° C.

7. The method as specified in claim 1, wherein the pH of said acidified slurry of dicalcium orthophosphate is from about 3.5 to 5.5.

8. The method as specified in claim 1, wherein all of said slurry is converted to said meta-stable gel-like material in less than about 3 minutes after formation of said gel-like material is manifested at the wall portions of said reaction vessel.

* * * * *